United States Patent
Piergiovanni et al.

(10) Patent No.: US 12,340,307 B2
(45) Date of Patent: Jun. 24, 2025

(54) FUTURE PREDICTION, USING STOCHASTIC ADVERSARIAL BASED SAMPLING, FOR ROBOTIC CONTROL AND/OR OTHER PURPOSE(S)

(71) Applicant: GOOGLE LLC, Mountain View, CA (US)

(72) Inventors: Anthony Jacob Piergiovanni, Nazareth, PA (US); Anelia Angelova, Sunnyvale, CA (US); Alexander Toshev, San Francisco, CA (US); Michael Ryoo, Rocky Point, CA (US)

(73) Assignee: GOOGLE LLC, Mountain View, CA (US)

( * ) Notice: Subject to any disclaimer, the term of this patent is extended or adjusted under 35 U.S.C. 154(b) by 287 days.

(21) Appl. No.: 17/638,469

(22) PCT Filed: Aug. 27, 2019

(86) PCT No.: PCT/US2019/048346
§ 371 (c)(1),
(2) Date: Feb. 25, 2022

(87) PCT Pub. No.: WO2021/040699
PCT Pub. Date: Mar. 4, 2021

(65) Prior Publication Data
US 2022/0305647 A1    Sep. 29, 2022

(51) Int. Cl.
*G06V 40/10*    (2022.01)
*B25J 9/16*    (2006.01)
(Continued)

(52) U.S. Cl.
CPC ............... *G06N 3/08* (2013.01); *B25J 9/161* (2013.01); *B25J 9/163* (2013.01); *B25J 9/1666* (2013.01);
(Continued)

(58) Field of Classification Search
CPC .......... G06N 3/08; G06N 3/045; G06N 3/044; G06N 3/048; G06N 3/047; B25J 9/161;
(Continued)

(56) References Cited

U.S. PATENT DOCUMENTS

| | | | |
|---|---|---|---|
| 2018/0137389 A1* | 5/2018 | Mathieu | G06V 10/454 |
| 2019/0317455 A1* | 10/2019 | Leon | G06N 3/042 |
| 2020/0082817 A1* | 3/2020 | Narayanan | G06N 3/045 |

FOREIGN PATENT DOCUMENTS

WO    2017201023    11/2017

OTHER PUBLICATIONS

European Patent Office; Communication pursuant to Article 94(3) issued in Application No. 19765914.7; 4 pages; dated Sep. 7, 2023.
(Continued)

*Primary Examiner* — Abby Y Lin
*Assistant Examiner* — Dylan M Katz
(74) *Attorney, Agent, or Firm* — Gray Ice Higdon

(57) ABSTRACT

Techniques are disclosed that enable the generation of predicted sequences of terminals using a generator model portion of a prediction model. Various implementations include controlling actuators of a robot based on the predicted sequences of terminals. Additional or alternative implementations include jointly training the generator model portion of the prediction model using a discriminator model portion of the prediction model using, for example, stochastic adversarial based sampling.

18 Claims, 8 Drawing Sheets

(51) Int. Cl.
|  |  |
| --- | --- |
| B25J 19/02 | (2006.01) |
| G06N 3/08 | (2023.01) |
| G06V 10/82 | (2022.01) |
| G06V 20/40 | (2022.01) |
| G06V 40/20 | (2022.01) |

(52) U.S. Cl.
CPC ............ *B25J 19/023* (2013.01); *G06V 10/82* (2022.01); *G06V 20/41* (2022.01); *G06V 40/10* (2022.01); *G06V 40/20* (2022.01)

(58) Field of Classification Search
CPC ........ B25J 9/163; B25J 9/1666; B25J 19/023; B25J 9/1697; B25J 9/1664; G06V 10/82; G06V 20/41; G06V 40/10; G06V 40/20; G06F 18/2414; G05B 13/027; G05B 2219/39387; G05B 2219/40202; G05B 2219/40308; G05B 2219/40532; G05B 13/048; Y02P 90/02
See application file for complete search history.

(56) References Cited

OTHER PUBLICATIONS

Piergiovanni, AJ et al.; "Learning Differentiable Grammars for Continuous Data;" arXiv.org; Cornell University; arXiv:1902.00505v1; 11 pages; Feb. 1, 2019.

Piergiovanni, AJ, et al. "Future Prediction With Adversarial Grammars;" ICLR 2020 Conference Paper 1049—Reviews; retrieved from the internet: URL:https://openreview.net/forum?id=Syl5mRNtvr; 12 pages; Sep. 25, 2019.

Qi, S. et al., Generalized Earley Parser: Bridging Symbolic Grammars and Sequence Data for Future Prediction; Cornell University; arXiv.org; arXiv:1806.03497v1; 12 pages; Jun. 9, 2018.

Qi, S. et al., "Predicting Human Activities Using Stochastic Grammar;" Cornell University; arXiv.org; arXiv:1708.00945v1; 11 pages; Aug. 2, 2017.

Vo, N. et al., "From Stochastic Grammar to Bayes Network: Probabilistic Parsing of Complex Activity;" 2014 IEEE Conference on Computer Vision and Pattern Recognition; 8 pages; Jun. 23, 2014.

Lee, A., et al., "Stochastic Adversarial Video Prediction;" Cornell University; arXiv.org; arXiv:1804.01523v1; 26 pages; Apr. 4, 2018.

Mathieu, M. et al., "Deep Multi-Scale Video Prediction Beyond Mean Square Error;" Cornell University; arXiv.org; arXiv:1511.05440v1; 9 pages; Nov. 17, 2015.

European Patent Office; International Search Report and Written Opinion of PCT Application Ser. No. PCT/US2019/048346; 16 pages; May 12, 2020.

Cho, K. et al., "Learning phrase representations using rnn encoder-decoder for statistical machine translation," arXiv:1406.1078, 15 pages; dated Sep. 3, 2014.

Finn, C., et al.; Unsupervised Learning for Physical Interaction through Video Prediction; Advances in Neural Information Processing Systems; pp. 1-9; dated 2016.

Goodfellow, I. et al., "Generative Adversarial Nets;" In Advances in Neural Information Processing Systems; 9 pages; 2014.

Ionescu et al. Human3.6m: Large Scale Datasets and Predictive Methods for 3d Human Sensing In Natural Environments. PAMI, 36(7), dated 2014.

Isola, Phillip et al.; Image-to-Image Translation with Conditional Adversarial Networks; CVPR; pp. 1125-1134; dated 2017.

Babaeizadeh, M. et al., "Stochastic Variational Video Prediction;" arXiv,org, arXiv:1710.11252v1; 12 pages; dated Oct. 30, 2017.

Brock, A. et al., "Large Scale GAN Training for High Fidelity Natural Image Synthesis;" International Conference on Learning Representations (ICLR); 35 pages; dated 2019.

Ionescu, C. et al., "Latent Structured Models for Human Pose Estimation;" In International Conference on Computer Vision (ICCV); 8 pages; dated Nov. 2011.

Denton, E. et al., "Stochastic Video Generation with a Learned Prior;" arXiv.org, arXiv:1802.07687v2; 12 pages; dated Mar. 2, 2018.

Denton, E. et al., "Deep Generative Image Models using a Laplacian Pyramid of Adversarial Networks;" Advances in Neural Information Processing Systems (NIPS); 9 pages; dated 2015.

Fedus, W. et al., "MaskGAN: Better Text Generation via Filling in the _; " International Conference on Learning Representations (ICLR); 17 pages; dated 2018.

Fragkiadaki, K. et al., "Recurrent Network Models for Human Dynamics;" Proceedings of the IEEE International Conference on Computer Vision (ICCV); 9 pages; dated 2015.

Han, F. et al., "Bottom-Up/Top-Down Image Parsing with Attribute Grammar;" IEEE Transactions on Pattern Analysis and Machine Intelligence, vol. 31, No. 1; pp. 59-73; dated Jan. 2009.

Hu, Z. et al., "Toward Controlled Generation of Text;" International Conference on Machine Learning (ICML); 10 pages; dated 2017.

Jain, A. et al., "Structural-RNN: Deep Learning on Spatio-Temporal Graphs;" Proceedings of the IEEE Conference on Computer Vision and Pattern Recognition (CVPR); 10 pages; dated 2016.

Jang, E. et al., "Categorical Reparameterization with Gumbel-Softmax;" In International Conference on Learning Representations (ICLR); 12 pages; dated 2017.

Lee, A.X. et al., "Stochastic Adversarial Video Prediction;" arXiv. org, arXiv:1804.01523v1; 26 pages; dated Apr. 4, 2018.

Liu, X. et al., "TreeGAN: Syntax-Aware Sequence Generation with Generative Adversarial Networks;" arXiv.org, arXiv:1808.07582v1; 11 pages; dated Aug. 22, 2018.

Maddison, C.J. et al., "The Concrete Distribution: A Continuous Relaxation of Discrete Random Variables;" In International Conference on Learning Representations (ICLR); 20 pages; dated 2017.

Martinez, J. et al., "On Human Motion Prediction Using Recurrent Neural Networks;" Proceedings of the IEEE Conference on Computer Vision and Pattern Recognition (CVPR); 10 pages; dated 2017.

Moore, D. et al., "Recognizing Multitasked Activities from Video using Stochastic Context-Free Grammar;" In Proceedings of AAAI Conference on Artificial Intelligence (AAAI); pp. 770-776; dated 2002.

Piergiovanni, A.J. et al., "Learning Differentiable Grammars for Continuous Data;" arXiv.org, arXiv:1902.00505v1; 11 pages; dated Feb. 1, 2019.

Pirsiavash, H. et al., "Parsing Videos of Actions with Segmental Grammars;" In Proceedings of the IEEE Conference on Computer Vision and Pattern Recognition (CVPR); pp. 612-619; dated 2014.

Ryoo, M.S. et al., "Recognition of Composite Human Activities Through Context-Free Grammar Based Representation;" In 2006 IEEE Computer Society Conference on Computer Vision and Pattern Recognition (CVPR); 8 pages; dated 2006.

Sigurdsson, G.A. et al., "Hollywood in Homes: Crowdsourcing Data Collection for Activity Understanding;" Proceedings of European Conference on Computer Vision (ECCV); 17 pages; dated 2016.

Socher, R., et al., "Parsing Natural Scenes and Natural Language with Recursive Neural Networks;" In Proceedings of the 28th International Conference on Machine Learning (ICML); 8 pages; dated 2011.

Tang, Y. et al., "Long-Term Human Motion Prediction by Modeling Motion Context and Enhancing Motion Dynamic;" International Joint Conference on Artificial Intelligence (IJCAI); 7 pages; dated 2018.

Villegas, R et al., "Learning to Generate Long-term Future via Hierarchical Prediction;" International Conference on Machine Learning (ICML); 10 pages; dated 2017.

Vo, N.N., et al., "From Stochastic Grammar to Bayes Network: Probabilistic Parsing of Complex Activity;" In Proceedings of the IEEE Conference on Computer Vision and Pattern Recognition (CVPR), 8 pages; dated 2014.

(56) References Cited

OTHER PUBLICATIONS

Wang, T-C. et al., "High-Resolution Image Synthesis and Semantic Manipulation with Conditional GAN;" In Proceedings of the IEEE Conference on Computer Vision and Pattern Recognition (CVPR); 10 pages; dated 2018.

Xu, J. et al., "Video Prediction via Selective Sampling;" Advances in Neural Information Processing Systems (NIPS); 11 pages; dated 2018.

Yang, F. et al., "Differentiable Learning of Logical Rules for Knowledge Base Reasoning;" Advances in Neural Information Processing Systems (NIPS); 10 pages; dated 2017.

Yeung, S. et al., "Every Moment Counts: Dense Detailed Labeling of Actions in Complex Videos;" International Journal of Computer Vision (IJCV); 15 pages; dated 2017.

Yogatama, D. et al., "Memory Architectures in Recurrent Neural Network Language Models;" International Conference on Learning Representations (ICLR); 10 pages; dated 2018.

Yu, L. et al., "SeqGAN: Sequence Generative Adversarial Nets with Policy Gradient;" Proceedings of AAAI Conference on Artificial Intelligence (AAAI); 7 pages; dated 2017.

Zhao, Y. et al., "Image Parsing with Stochastic Scene Grammar;" In Advances in Neural Information Processing Systems; 9 pages; dated 2011.

Zhu, S-C. et al., "A Stochastic Grammar of Images;" Foundations and Trends Computer Graphics and Vision; vol. 2, No. 4; 105 pages; dated 2007.

\* cited by examiner

FUTURE PREDICTION, USING STOCHASTIC ADVERSARIAL BASED SAMPLING, FOR ROBOTIC CONTROL AND/OR OTHER PURPOSE(S)

BACKGROUND

A robot (sometimes referred to as an "agent" may be able to perform a variety of tasks such as gripping an object with an end effector of the robot, planning a path for the robot to traverse in an environment, traversing a planned path in the environment, etc. To successfully perform a particular task in the environment, the robot may need to determine its current state in the environment by making an observation. A camera may be mounted to the robot or mounted somewhere in the environment to capture the current environment of the robot at a first time instance. For example, the camera may capture the pose of a human in the environment with the robot. If the robot were to begin performing the particular task, then the robot may predict future activity in the environment at a second time instance, such as the pose of the human in the environment at the second time instance, based on the environment of the robot at the first time instance and/or based on one or more additional initial previous observations.

SUMMARY

Techniques described herein are directed towards predicting one or more sequences of future activity in an environment with a robot using an adversarial prediction model. An adversarial prediction model (also referred to herein as a 'prediction model', an 'adversarial grammar model', a 'grammar model', an 'adversarial grammar', a 'grammar', etc.) can be used to generate one or more predicted sequences of multidimensional activity in the environment with the robot. For example, the prediction model can predict sequence(s) of activity of a human in the environment with the robot over several time steps in the future. Additionally or alternatively, the pose of one or more joints of a human can be predicted using the prediction model over several time steps in the future. Similarly, the activity and/or pose of an additional robot, of another dynamic object, etc. can be predicted using the prediction model.

The adversarial prediction model can be trained to learn a set of production rules represented in a training data set. In many implementations, the prediction model can include an encoder portion, a generator model portion, as well as a discriminator model portion. One or more observations of the environment can be processed using the encoder to determine an initial non-terminal. In various implementations, the one or more observations can be captured using sensor(s) of the robot and can include, for example, a continuous video sequence captured using a camera of the robot. The initial non-terminal is an encoded representation of activity, an encoded representation of pose and/or an encoded representation of additional component(s) in the environment. The prediction model can be trained to learn one or more rules associated with each non-terminal, where each rule includes a corresponding terminal and a corresponding next non-terminal. In many implementations, the terminal is an output symbol, and the prediction model generates sequence(s) of terminals indicating the future predicted activity.

As one non-limiting example, a set of rules for an example baseball data set with actions and sequences from a baseball game can include:

P→(pitch, S)|(pitch, B)|(pitch, K)|(pitch, U)|(pitch, Y)
S→(swing, H)|(swing, K)
U→(bunt, H)|(bunt, K)
H→(hit, P)|(foul, P)
B→(ball, P)
K→(strike, P)
Y→(hit by pitch, P)

In the illustrated example, P, S, U, H, B, K, and Y are non-terminals. Each non-terminal is followed by one or more rules (i.e., a corresponding (terminal, next non-terminal) pair). For example, given an initial non-terminal P, the generator model can determine the set of rules of (pitch, S), (pitch, B), (pitch, K), (pitch, U), and (pitch, Y). A rule can be selected, such as the rule (pitch, S), and the corresponding terminal 'pitch' can be assigned to the predicted sequence. The corresponding next non-terminal 'S' can be processed using the generator model to determine a set of rules corresponding with the non-terminal 'S': (swing, H) and (swing, K). The rule (swing, H) can be selected and the corresponding terminal 'swing' can be assigned to the predicted sequence. In the illustrated example, the non-terminal H has two corresponding rules: (hit, P) and (foul, P) where each rule indicates a different terminal for the predicted sequence. In other words, selection of the rule (hit, P) will associate the terminal 'hit' with the predicted sequence, and selection of the rule (foul, P) will associate the terminal 'foul' with the predicted sequence.

In many implementations, the generator model can be used to determine multiple sequences of predicted terminals by selecting multiple rules associated with a given non-terminal where the terminal corresponding to each selected rule can be assigned to a distinct predicted sequence. In many implementations, a stochastic rule selection process can be used in selecting one or more rules associated with a given non-terminal to generate multiple predicted sequences including a Gumbel-Softmax process, a pseudo-random rule selection process, and/or one or more additional stochastic processes. The generator model can be used to recursively process each next non-terminal for each selected rule to generate predicted sequences until one or more conditions are satisfied including the length of predicted sequence(s) of terminals exceeding a defined number of terminals, the generator model generating a defined number of predicted sequences, and/or additional condition(s) can be satisfied. For instance, the generator model can be used to recursively process each next non-terminal until the predicted sequence of terminals is five terminals long, ten terminals long, twenty terminals long, and/or additional number(s) of terminals long. Additionally or alternatively, the generator model can be used to recursively process each next non-terminal until three rules are processes for each given non-terminal, four rules are processed for each given non-terminal, and/or additional number(s) of rules are processed for each given non-terminal. In many implementations, the generator model can be used to recursively process each next non-terminal until multiple conditions are satisfied. For instance, the generator model can be used to recursively process each next non-terminal until at least two rules are selected for the given non-terminal until a total of twenty non-terminals are processed.

Given a set of non-terminals containing a number of potential 'futures', an adversarial based sampling can be learned to sample the most likely rules for a given input. The generator model can be jointly trained with a discriminator model similar to a Generative Adversarial Network ("GAN") training approach. In many implementations, the use of a discriminator model during training allows the prediction model to generate realistic sequences that may not match the ground truth training data without being penalized. In several implementations, the discriminator model portion is only utilized when jointly training the generator model, and as such, the discriminator model can be discarded after training is complete. In other words, the discriminator model can be utilized during training, but not utilized (and optionally not even present) during inference.

A predicted activity sequence can be used in controlling one or more actuators of the robot. In many implementations, the predicted activity sequence can be utilized by a path planning system of the robot to plan a path based on the predicted activity sequence. The actuator(s) of the robot can be controlled based on the planned path. For example, a predicted sequence of terminals can predict the poses of a human in the environment for the next five seconds. The planning system of a robot can determine a path to position the robot to avoid the predicted poses of the human over the next five seconds. As another example, the planning system of the robot can determine a path to interact with the object based on the predicted sequence of terminals. For example, the predicted sequence of terminals can provide an indication of the poses of an object falling off a table onto the floor over the next two seconds.

In some implementations, predicted poses(s) of the object based on the predicted sequence of terminals can be used as target waypoint(s) in in path planning (i.e., the planning system of the robot can plan a path to interact with the object at a predicted future location of the object). For example, the planning system of the robot can determine a path to catch the falling object based on the predicted sequence of terminals. Similarly, the planning system of a sheep herding robot can determine a path to herd sheep based on predicted location(s) of the sheep using the predicted sequence of terminals. In some implementations, predicted pose(s) of the object can be used as obstacle(s)/area(s) to avoid in path planning and/or trajectory generation. In many implementations, a planning system can determine a path to avoid and/or interact with an object based on multiple predicted sequences of terminals. For example, the planning system can determine a path of robot to avoid another robot based on ten distinct sequences of terminals predicting the future poses of the other robot, where the path determined using the planning system avoids predicted poses for the other robot based on each of the predicted sequences of terminals.

Accordingly, various implementations set forth techniques for training a generator model portion of a prediction model to generate realistic sequences of predicted terminals not matching ground truth training data—and to do so in a manner that enables highly accurate future prediction over many time steps. Implementations disclosed herein increase the accuracy of future prediction over many future time steps. Additionally or alternatively, implementations disclosed herein can predict highly accurate predicted future sequences capturing multidimensional activity in an environment. Actuator(s) of a robot may be controlled based on these highly accurate sequences of predicted futures.

In many implementations, jointly training the generator model with the discriminator model portion of the prediction model using adversarial based sampling greatly reduces the amount of training data required to train the generator model, and/or allows the generator model to generate sequences of predicted futures not represented in the training data.

The above description is provided only as an overview of some implementations disclosed herein. These and other implementations of the technology are disclosed in additional detail below.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
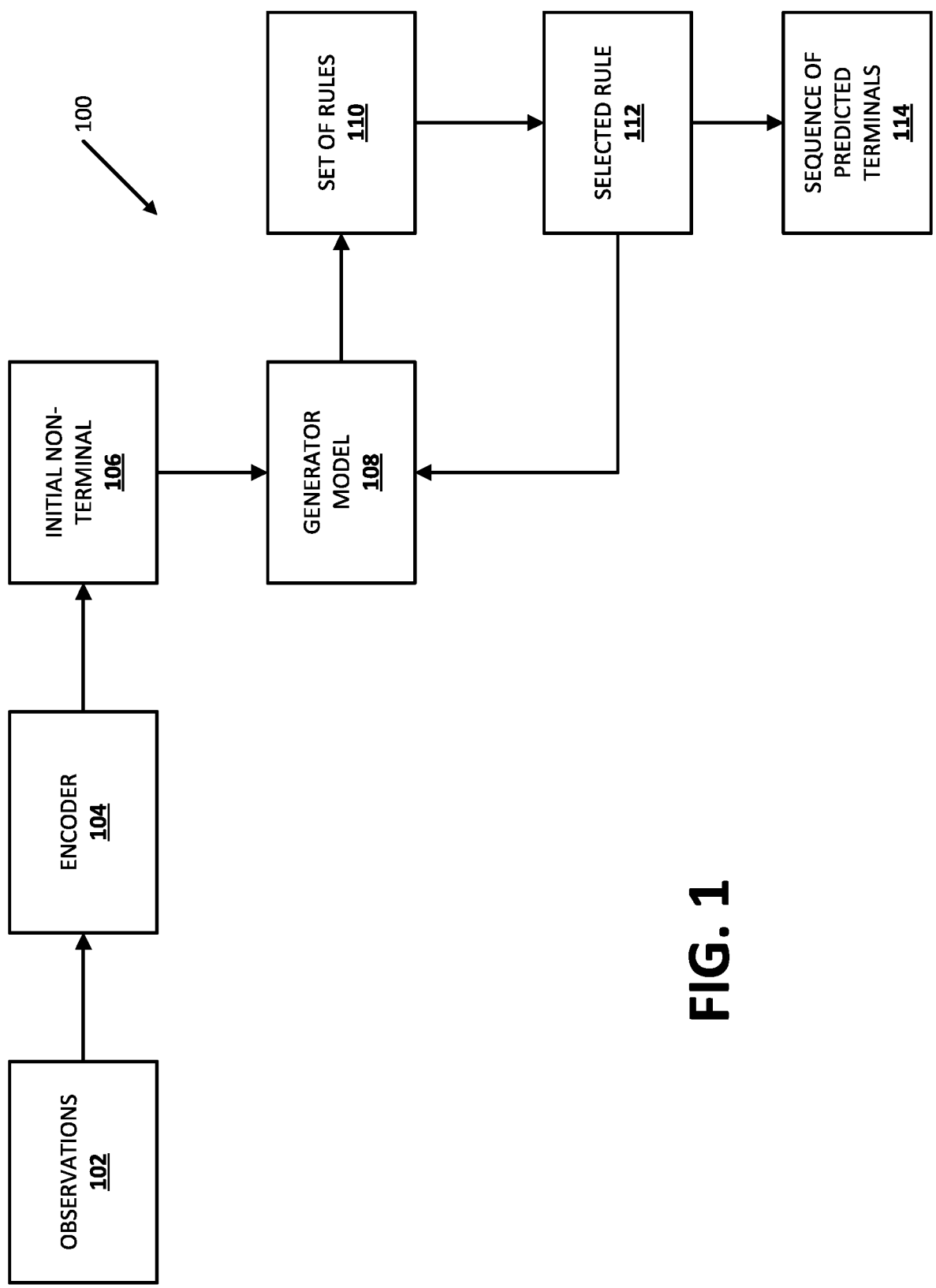
FIG. 1 illustrates an example of determining a sequence of predicted terminals in accordance with various implementations disclosed herein.

Future prediction in videos is a challenging visual tasks. Being able to accurately predict future activities such as a human or an object's pose has many important implications, including robot action planning. Prediction is particularly hard with high dimensional output data and because it is not a deterministic process as multiple potential 'futures' are possible. Given the challenge of predicting high-dimensional stochastic futures, the long standing questions of how should the sequential dependencies in the data be modeled and how can multiple possible (long-term) future outcomes be predicted at any given time can be addressed in accordance with implementations disclosed herein.

An adversarial grammar model in accordance with implementations disclosed herein addresses the problem of future prediction. In a variety of implementations, the model can be a differentiable form of a regular grammar trained with adversarial sampling of various possible futures in high dimensional space. Learning sequences of actions or other sequential processes with the imposed rules of a grammar is valuable, as it imposes temporal structural dependencies. At the same time, the use of adversarial sampling when learning the grammar rules allows the adversarial process to be able to produce multiple candidate future sequences that follow a similar distribution to those seen in the data. More importantly, a traditional grammar will need to enumerate all possible rules (exponential growth in time) to learn multiple futures. An adversarial stochastic sampling process allows for much more memory-efficient learning without enumeration. Additionally, unlike other techniques for future generation, the adversarial grammar is able to learn long sequences, can handle multi-label settings, and can predict much further into the future.

The proposed approach is driven by the structure imposed from learning grammar rules and their relationships to the terminal symbols of the data and by the adversarial losses which help model the data distribution over long sequences. Future prediction can be evaluated on high dimensional data, and techniques disclosed herein are able to predict much further in the future than prior work. The proposed approach is also general—it can be applied to diverse future prediction tasks such as 3D human pose prediction and multi-class and multi-label activity forecasting. Additionally or alternatively, the proposed approach can be applied on multiple datasets.

The notion of grammars in computational science was introduced for the description of language, and has found a wide spread use in natural language understanding. In the domain of visual data, grammars can be used to parse images of scenes. Generative Adversarial Networks (GANs) are a very powerful mechanism for data generation by learning an underlying distribution of training data through adversarial sampling.

Techniques described herein are driven by learning grammar rules (also referred to herein as "rules"), with which the transitions between continuous events in time can be learned, for example the transitions between 3D human poses can be learned. While an activity or action may be continuous, it can also spawn into many possible futures at different points, similarly to switching between rules in a grammar. For example, an activity corresponding to 'walking' can turn into 'running', continuing the 'walking' behavior, or change to 'stopping'. These transition rules are learned in a differentiable fashion with an adversarial mechanism which allows learning multiple candidate future sequences. This enables robust future prediction, which can easily generate multiple realistic futures.

In many implementations, sequences can be modeled by learning the rules of a regular grammar. A regular grammar can be represented as the tuple $\{N, T, P, S\}$ where N is a finite non-empty set of non-terminals, T is a finite set of terminals (or output symbols), P is a subset of production rules which are of the form $A \to aB$, $A \to b$, $A \to \in$ where A, $B \in N$, $a, b \in T$, and $\in$ is the empty string, and S is the starting non-terminal symbol, $S \in N$.

One objective is to learn such non-terminals (e.g., A) and terminals as a latent representations directly from training data, and model the production rules P as a generator neural network function. That is, at the heart of the proposed method is learning nonlinear function G which transitions from a given non-terminal to a given set of rules. Each rule derived from the non-terminal A can be expressed as a pair of a non-terminal and terminal $\{(N_i, t_i)\}_i$.

For any latent non-terminal A, the grammar production rules are generated by G as:

$$\{(N_i, t_i)\}_{i=1:K} = G(A)$$

where G is a neural network with learnable parameters that outputs a set of (non-terminal, terminal) pairs $(N_i, t_i)$, $i=1 \ldots K$ which correspond to the set of production rules for this non-terminal. The rules, in particular, expand as follows:

$A \to t_1 N_1$
$A \to t_2 N_2$
$\ldots$
$A \to t_K N_K$

This function is applied recursively to obtain a number of output sequences, similar to prior recurrent methods, e.g., RNNs and LSTMs. However, it learns explicit production rules that can be exploited for learning more complex output tasks with multiple possibilities.

For example, suppose A is the non-terminal that encodes the activity for 'walking'. An output of the rule $A \to$ walkingA will be able to generate a sequence of continual 'walking' behavior. Furthermore, additional rules which G can learn to output, e.g., $A \to$ stoppingS, $A \to$ runningW, can allow for the activity to switch to 'stopping' or 'running' (with the non-terminals S, W respectively learning to generate their corresponding potential futures). Clearly, for high dimensional outputs, such as 3D human pose, the number and dimensionality of the non-terminals required will be larger.

To accomplish the above task, G can have a special structure. A number of non-terminals and terminals are learned, e.g., $K_N$ non-terminals of dimensionality $D_N$, and $K_T$ terminals of dimensionality $D_T$ (the latter naturally correspond to the number and dimensionality of the desired outputs). First, using several nonlinear transformations, G maps an input non-terminal to a set of memory units which corresponds to the rules for the given input non-terminal. $K_R$ rule units of dimensionality $D_R$ can be learned. The memory units are shared globally, but only a subset are selected for each non-terminal. These are reminiscent of using memory with recurrent neural network methods, the main difference is that the memory units are used to build grammar-like rule structures which are more advantageous in explicitly modeling temporal dependencies. This process can be described as the function $r = f_R(A)$ where r is the production rule mapped from the non-terminal A.

In order to generate multiple outputs, the nonlinearities can be followed by the Gumbel-Softmax function, which allows for stochastic selection of rules. The Gumbel-Softmax function allows for differentiable selection of a rule from a set of many possible rules. The probability of each rule being selected and the different outcomes are learned.

For each production rule, two nonlinear functions $f_T$ and $f_N$ are learned, which when given a rule, generate output of the resulting terminal and non-terminal: $N = f_N(r)$, $t = f_t(r)$. These functions are both a sequence of nonlinear layers followed by a non-linear activation function (e.g., softmax or sigmoid depending on the task). As a result, $G(A) = \{(f_N(f_R(A)), f_t(f_R(A)))\}$.

The non-terminals and terminals are modeled as sets of high dimensional vectors with pre-specified size and are learned jointly with the rules (all are tunable parameters and naturally more complex datasets require larger capacity). For example, for a simple C-class classification problem, the terminals are represented as C-dimensional vectors matching the one-hot encoding for each class.

Given an initial input data sequence (e.g., a short video and/or pose sequence), many implementations can learn to generate a corresponding non-terminal. This is used as input to G to generate a sequence of terminal symbols starting from the given non-terminal. Concretely, given the initial input sequence X, a function s is learned which gives the starting non-terminal $N_0 \in S$, $N_0 = s(X)$. Given $N_0$, the function G is applied recursively to obtain the possible sequences:

$$N_0 = s(X)$$

$$\{N_{j+1}^i, t_{j+1}^i\}_i = G(N_j), \text{ for } j \geq 0$$

The function G generates a set of (non-terminal, terminal) pairs, where the non-terminals will potentially turn into new rules to obtain the next set of (non-terminal, terminal) pairs.

Note that in most cases, each rule generates a different non-terminal, thus sampling G many times will lead to a variety of generated sequences. As a result, an exponential number of sequences would need to be generated during training, to cover the possible sequences. For example, consider a branching factor of k rules per non-terminal with a sequence of size q. This results in $k^q$ terminals and non-terminals (e.g., k=2 has ~1000, and for k=3 has ~60, 000). Thus, enumerating all possible sequences is computationally prohibitive beyond k=2. Furthermore, this restricts the tasks that can be addressed to ones with lower dimensional outputs because of memory limits. With k=1 (i.e., no branching), this reduces to a standard RNN, unable to generate multiple possible future sequences.

This problem can be addressed by building a stochastic adversarial rule sampling. Given the non-terminals, which effectively contain a number of potential 'futures', an adversarial-based sampling can be learned, similar to GAN approaches, which can learn to sample the most likely rules for the given input. The use of a discriminator network allows the model to generate realistic sequences that may not match the ground truth without being penalized.

The function G(n, t=G (s(X))) capturing the learned grammar described above can be used as the generator function, and an additional discriminator function D can be built. Following style GAN training, the discriminator function returns a binary prediction which discriminates examples from the data distribution vs. generated ones. Note that the adversarial process is designed to ultimately generate terminals, i.e., the final output sequence for the model D is defined as:

$$p = D(n, t)$$

More specifically, D is tasked with the prediction of p∈{True, False} based on if the input sequence of terminals, t, is from the data or not. Note that in many implementations, the discriminator is also conditioned on the non-terminal sequence, thus the distribution on non-terminals is learned implicitly, as well.

The discriminator function D can be implemented as follows: given an input non-terminal and terminal sequence, several 1D convolutional layers can be applied to the terminals and non-terminals. The output of the 1D convolutional layers can be concatenated and followed by a fully-connected layer to produce the binary prediction. In many implementations, a GRU can be applied to the input non-terminal and terminal sequence in place of the 1D convolutional layers. Additional and/or alternative neural network configurations can be utilized to implement the discriminator function.

The discriminator and generator (grammar) functions can be trained to work jointly, as is in GAN style training. They are guided by the following losses:

Suppose V is an adversarial loss function, then the losses are defined as follows:

$$L_{adv,gen} = V(D(n_{sampled}, t_{sampled}), 1)$$

$$L_{adv,disc} = V(D(n_{true}, t_{true}), 1) + V(D(n_{sampled}, t_{sampled}), 0)$$

Where $n_{sampled}$, $t_{sampled}$ are data generated from the model, $t_{true}$ is the ground truth sample, and $n_{true}$ is the result of s(X) with starting X, corresponding to $t_{true}$. The loss function V is cross-entropy in this case, but can take other forms.

While the sequences generated by G can be compared to the ground truth to compute loss during training, doing so requires enumerating many possibilities in order to learn multiple rules. By using the adversarial training of G, the model is able to generate sequences that match the distribution observed in the dataset. This allows for computationally feasible learning of longer, higher-dimensional sequences.

Turning to the figures, FIG. 1 illustrates an example 100 of generating a sequence of predicted terminals utilizing a prediction model in accordance with various implementations. In the illustrated example 100, one or more observations 102 are processed using an encoder 104 portion of the prediction model to generate an initial non-terminal 106. Observations 102 can include a variety of data captured using one or more sensors of a robot including a continuous video sequence captured using a camera of the robot. Other types of data representing observations may alternatively or additionally be used.

Initial non-terminal 106 can be processed using the generator model 108 portion of the prediction model to determine a set of rules 110 corresponding with the initial non-terminal 106. A selected rule 112 can be selected from the set of rules 110. In many implementations, each rule includes a corresponding terminal and a corresponding next non-terminal pair. The terminal corresponding to selected rule 112 can be assigned as the next terminal in the sequence of predicted terminals 114. To continue generating the sequence of predicted terminals 114, the next non-terminal corresponding with the selected rule 112 can be processed using the generator model 108 to determine an additional set of rules 110, an additional selected rule 112 can be selected from the additional set of rules 110, and an additional terminal corresponding to the additional selected rule 112 can be assigned to the sequence of predicted terminals 114. In many implementations, multiple sequences of predicted terminals 114 can be generated by selecting multiple rules at each iteration from the set of rules 110, and recursively processing the next non-terminals to generate the multiple sequences of terminals.

Figure 2:
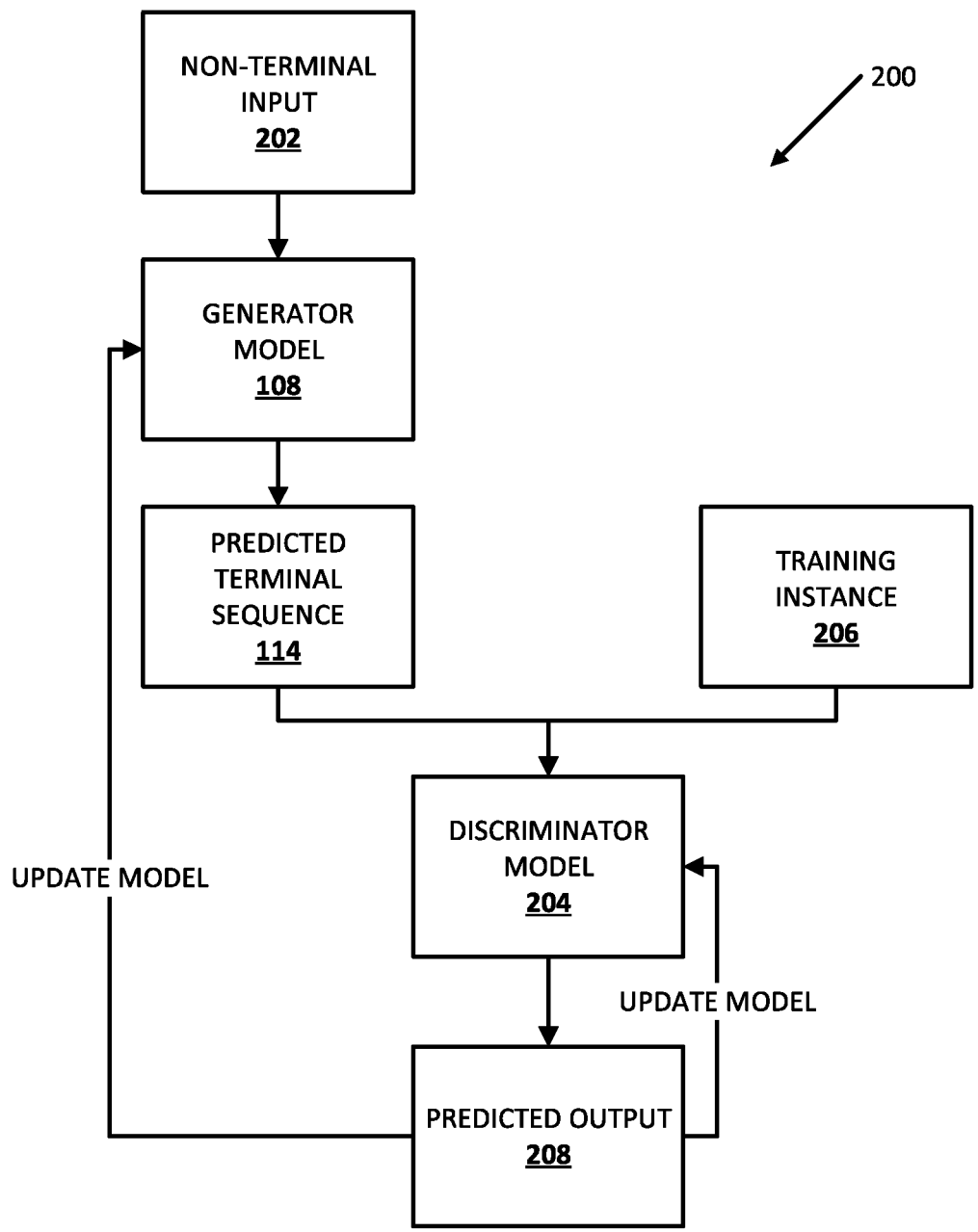
FIG. 2 illustrates an example of jointly training a generator model portion and a discriminator model portion of a prediction model in accordance with various implementations disclosed herein.

FIG. 2 illustrates an example of jointly training a generator model portion and a discriminator model portion of a prediction model using adversarial based sampling. In many implementations, the generator model and discriminator model can be jointly trained using a GAN style of training. In the illustrated example 200, non-terminal input 202 can be processed using a generator model 108 to generate predicted terminal sequence 114. In many implementations, non-terminal input 202 can be a randomly determined initial non-terminal. Additionally or alternatively, non-terminal input 202 can be generated by processing a portion of a training instance 206 using an encoder portion of the prediction model.

Discriminator model 204 can process the predicted terminal sequence 114 and/or at least a portion of training instance 206 to generate predicted output 208. In many implementations, the predicted output 208 is a binary prediction which discriminates a ground truth portion of training instance 206 from predicted terminal sequence(s) 114 generated using the generator model 108 (i.e., discriminates data from the training data distribution from generated data sequences generated using the generator model which are not explicitly found in the training data distribution). One or more portions of the generator model 108 can be updated when predicted output 208 correctly predicts the predicted terminal sequence 114 was generated using the generator model 108 and/or correctly predicts the training instance 206 is part of the training data distribution. Additionally or alternatively, one or more portions of the discriminator model 204 can be updated when the predicted output 208 incorrectly predicts the predicted terminal sequence 114 is part of the training data distribution and/or a ground truth portion of the training instance 206 is generated using the generator model 108.

Figure 3:
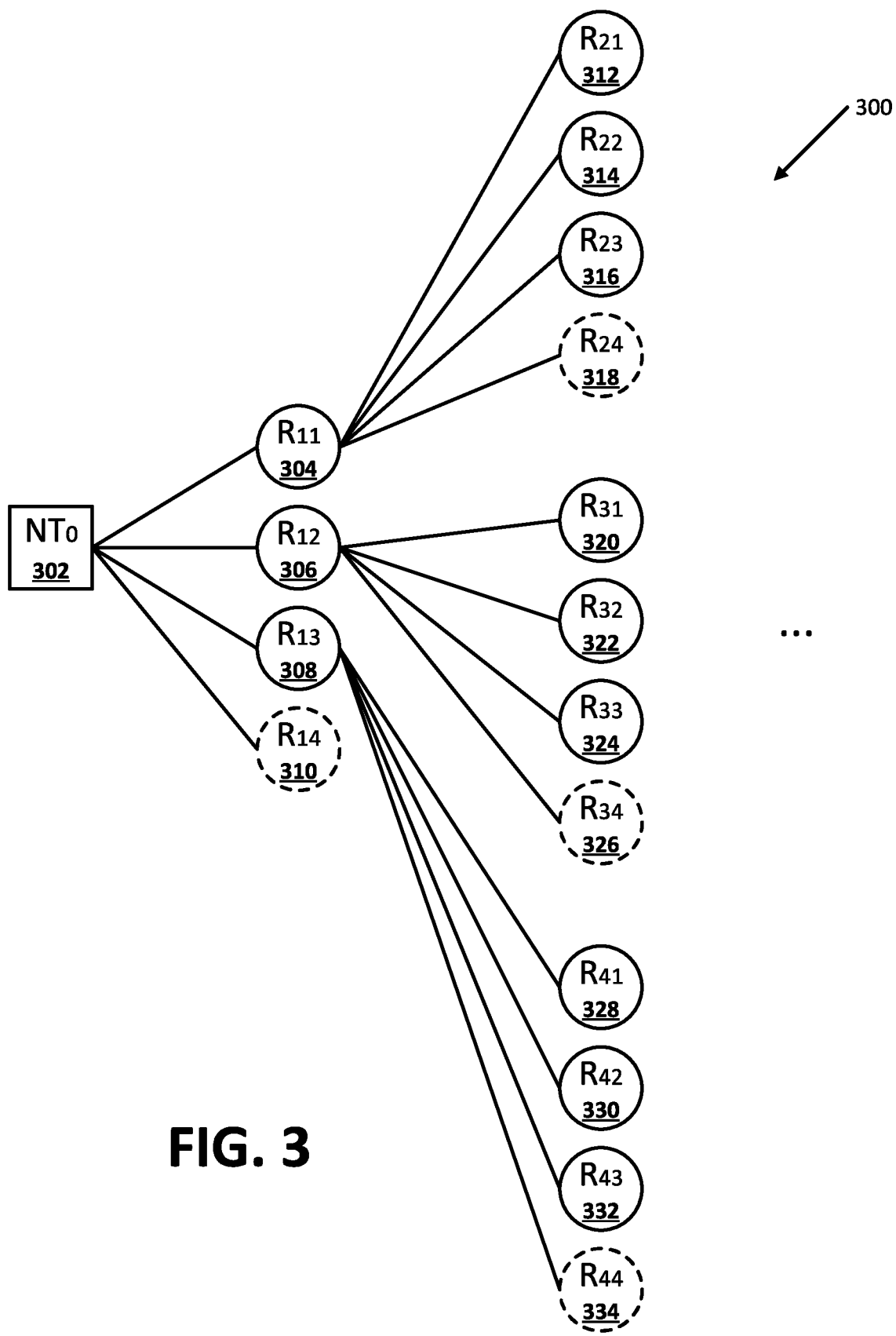
FIG. 3 illustrates an example of generating multiple predicted sequences from an initial non-terminal in accordance with various implementations disclosed herein.

FIG. 3 illustrates an example of generating multiple sequences of predicted terminals in accordance with many implementations. The illustrated example 300 includes an initial non-terminal $NT_0$ 302. In many implementations, the initial non-terminal $NT_0$ 302 can be generated by processing one or more observations capturing the environment of a robot using an encoder portion of the prediction model. The initial non-terminal $NT_0$ 302 can be processed using the generator model to determine a corresponding set of rules $R_{11}$ 304, $R_{12}$ 306, $R_{13}$ 308, and $R_{14}$ 310. In many implementations, rules $R_{11}$ 304, $R_{12}$ 306, and $R_{13}$ 308 can be selected, and the terminals corresponding with each of the selected rules can be assigned to a sequence of predicted terminals. In the illustrated example, $R_{14}$ 310 is not selected, and therefore the terminal corresponding with the unselected rule is not assigned to any sequence of predicted terminals.

In many implementations, the next non-terminal corresponding with each of the selected rules $R_{11}$ 304, $R_{12}$ 306, and $R_{13}$ 308 can be processed using the generator model to determine additional sets of rules. For example, $R_{11}$ 304 can be processed using the generator model to determine the corresponding set of rules of $R_{21}$ 312, $R_{22}$ 314, Rn 316 and $R_{24}$ 318. Rules $R_{21}$ 312, $R_{22}$ 314, and Rn 316 are selected while $R_{24}$ 318 is not selected. The terminals corresponding with each of the selected rules $R_{21}$ 312, $R_{22}$ 314, and Rn 316 can be assigned to corresponding sequences of predicted terminals. Similarly, $R_{12}$ 306 can be processed using the generator model to determine the set of rules $R_{31}$ 320, $R_{32}$ 322, $R_{33}$ 324, and $R_{34}$ 326. Rules $R_{31}$ 320, $R_{32}$ 322, and $R_{33}$ 324 are selected while rule $R_{34}$ 326 is not selected. The terminals corresponding with each of the selected rules $R_{31}$ 320, $R_{32}$ 322, and $R_{33}$ 324 can be assigned to corresponding sequences of predicted terminals. Additionally or alternatively, $R_{13}$ 308 can be processed using the generator model to generate the corresponding set of rules of $R_{41}$ 328, $R_{42}$ 330, $R_{43}$ 332, and $R_{44}$ 334. Rules $R_{41}$ 328, $R_{42}$ 330, and $R_{43}$ 332 are selected while rule $R_{44}$ 334 is not selected. The terminals corresponding with each of the selected rules $R_{41}$ 328, $R_{42}$ 330, and $R_{43}$ 332 can be assigned to corresponding sequences of predicted terminals.

In many implementations, the process of determining a set of rules using a next non-terminal, selecting one or more of the determined rules, and assigning the terminal corresponding to the selected rule(s) can be assigned to a sequence of predicted terminals can be repeated until the sequences of predicted terminals satisfies one or more conditions. For example, conditions can include a constraint on the number of rules selected for a given non-terminal, a constraint on the length of a predicted sequence of terminals, a constraint on the number of predicted sequences of predicted terminals, etc. Example 300 is an illustrative example where three rules are selected at each iteration. However, an additional and/or alternative number of rules can be selected, an additional and/or alternative number of rules can be associated with the initial non-terminal, an additional and/or alternative number of rules can be associated with the next non-terminal corresponding to selected rules, etc.

Figure 4:
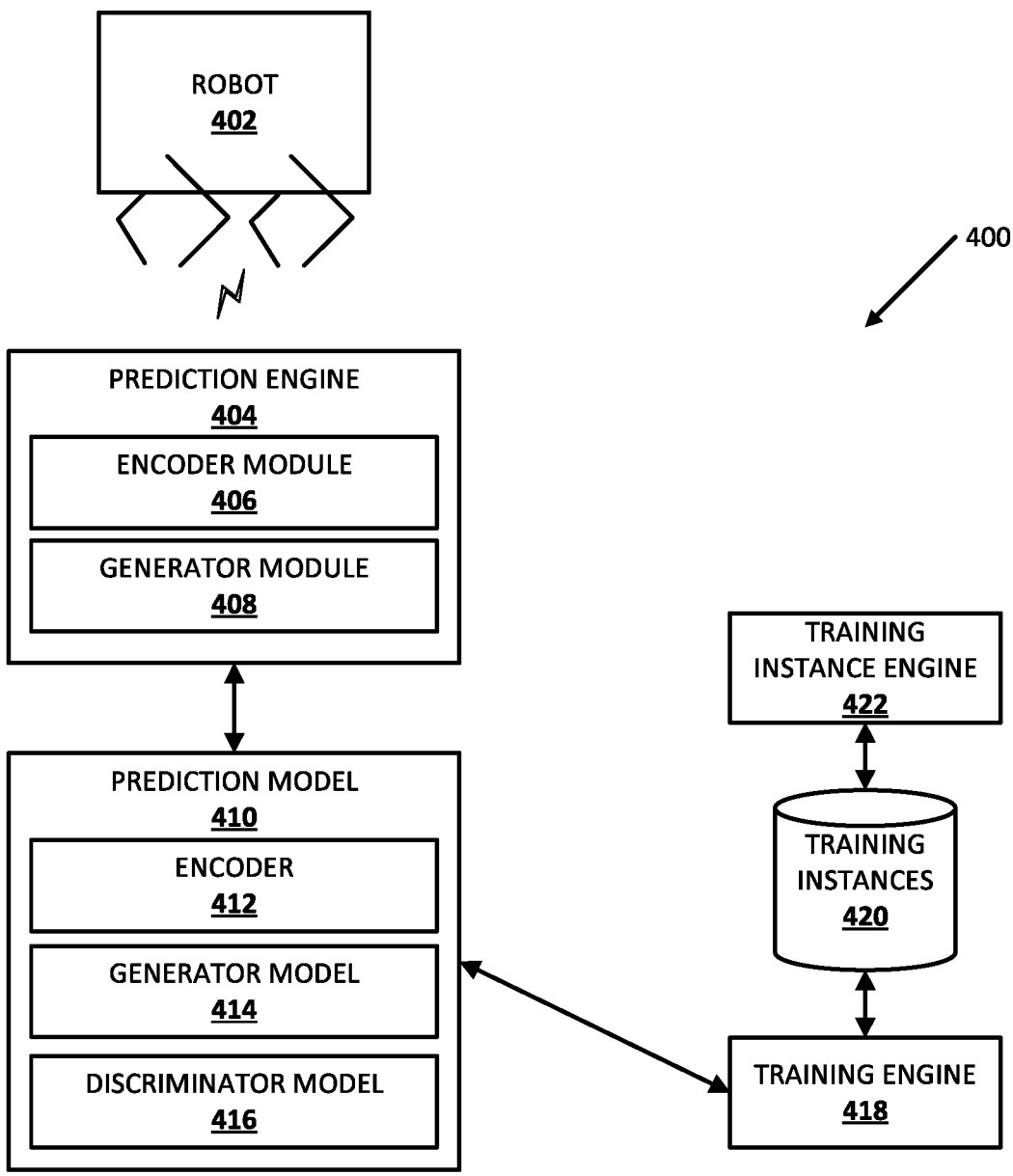
FIG. 4 illustrates an example environment in which various implementations disclosed herein can be implemented.

FIG. 4 illustrates an example environment 400 in which implementations described herein may be implemented. FIG. 4 includes an example robot 402, a prediction engine 404, a training engine 418, a training instance engine 422, and/or additional engine(s) (not depicted). Also included is prediction model 410, and training instances 420.

Robot 402 is a legged robot having multiple degrees of freedom to enable robotic locomotion by controlling actuator(s) 430 of the legs of the robot 402. For example, robot 402 can be a quadruped robot (i.e., four legged robot), where each leg is controlled by two actuators that allow the leg to move in the sagittal plane. For instance, a first actuator of a corresponding leg can be at an attachment point between the leg and a body of the robot 402, and a second actuator of the corresponding leg can be between the attachment point and a distal end of the corresponding leg (e.g., at a "knee" of the leg). The motors can be actuated based on one or more predicted sequences of activities generated using prediction engine 404. Although a particular robot 402 is illustrated in FIG. 1, additional and/or alternative robots may be utilized including robots having more legs (e.g., a five legged robot, a six legged robot, an eight legged robot, and/or a robot with additional legs), robots having fewer legs (e.g., a three legged robot, a two legged robot), robots having robot arms, robots having a humanoid form, robots having an animal form, robots that include one or more wheels in addition to or as an alternative to robot legs, and so forth.

The robot 402 comprises one or more environmental sensors configured to capture observations (e.g. sensor data) relating to a local environment of the robot 402. The environmental sensors may comprise one or more visual sensors. For example, the robot 402 may comprise visual sensors configured to capture a continuous video of the environment of the robot 402. Visual sensors may alternative or additionally comprise visual sensors configured to periodically capture still images of the environment of the robot 402, for example every two seconds. Further examples of environmental sensors include, but are not limited to: LIDAR sensors; acoustic sensors (e.g. microphones, sonar sensors); RF sensors; active and/or passive infrared sensors; light sensors; pressure sensors; pressure wave sensors (e.g., microphones); proximity sensors; accelerometers; gyroscopes; thermometers; and/or barometers.

Training instance engine 422 can be utilized to generate training instances 420. For example, each training instance 420 can include a ground truth sequence of predicted activities, one or more initial observations corresponding to the ground truth sequence, and/or additional data.

In many implementations, prediction model 410 can include encoder 412, generator model 414, and discriminator model 416. Training engine 418 can be utilized to train prediction model 410. For example, encoder 410 can be trained using training engine 442 to determine an initial non-terminal based on one or more observations. During training, a predicted initial non-terminal for the corresponding one or more observations may be compared to a known non-terminal for said one or more observations in order to determine parameter updates for the encoder 410. A loss function may be used to compare the predicted initial non-terminal to the known initial non-terminal. In many implementations, training engine 418 can jointly train generator model 414 and discriminator model 416 using adversarial based sampling.

Prediction engine 404 can include encoder module 406, generator module 408, and/or additional module(s) (not depicted). In many implementations, encoder module 406 can process one or more observations capturing the environment of a robot to determine an initial non-terminal. Generator module 408 can be utilized to determine one or more sequences of predicted terminals by recursively processing the initial non-terminal using the generator module 414 to determine a set of rules, each rule with a corresponding terminal and next non-terminal. One or more rules can be selected form the set of rules, and the corresponding terminal(s) of the selected rule(s) can be assigned to sequence(s) of predicted terminals. Additionally or alternatively, generator module 408 can generate sequences of predicted terminals by recursively process the next non-terminals corresponding with the selected rules using generator model 414 to determine additional sets of rules each with a corresponding terminal non-terminal pair.

Figure 5:
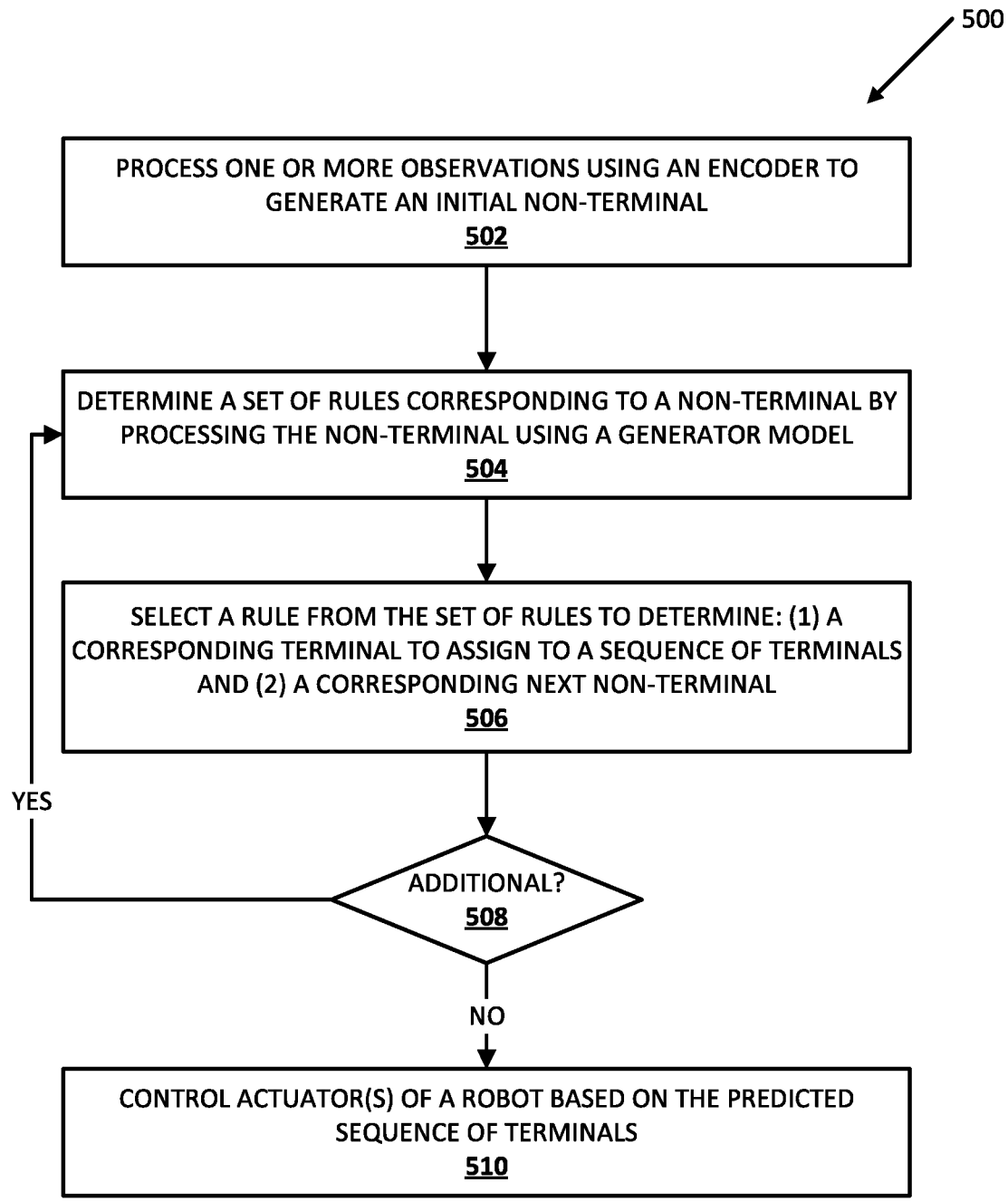
FIG. 5 is a flowchart illustrating an example process in accordance with implementations disclosed herein.

FIG. 5 is a flowchart illustrating a process 500 of determining a sequence of predicted terminals using a generator model portion of a prediction model according to implementations disclosed herein. For convenience, the operations of the flowchart are described with reference to a system that performs the operations. This system may include various components of various computer systems. Moreover, while operations of process 500 are shown in a particular order, this is not meant to be limiting. One or more operations may be reordered, omitted, and/or added.

At block 502, the system processes one or more observations using an encoder portion of a prediction model to generate an initial non-terminal. The one or more observations can include a continuous video of an environment of a robot. Other data (i.e. sensor data) may additionally be processed by the encoder. In many implementations, the initial non-terminal is an encoded representation of the activity in the environment. For example, the initial non-terminal can be an encoded representation of the 3D pose of a human At block 504, the system determines a set of rules corresponding to a non-terminal by processing the non-terminal using a generator model portion of the prediction model. In an initial iteration, the non-terminal is the initial non-terminal determined at block 502. In various implementations, each rule has a corresponding terminal as well as a corresponding next non-terminal.

At block 506, the system selects a rule from the set of rules to determine (1) a corresponding terminal to assign to a sequence of predicted terminals and (2) a corresponding a next non-terminal.

At block 508, the system determines whether to process any additional next non-terminals. If so, the system proceeds back to block 504, determines an additional set of rules corresponding to the next non-terminal using the generator model, before proceeding to block 506. If not, the system proceeds to block 510.

At block 510, the system controls one or more actuators of a robot based on the predicted sequence of terminals. In many implementations, the system can control the actuator(s) of the robot to avoid the predicted location of a human, an object, an additional robot, etc. in the environment with the robot. In some implementations, the system can begin controlling the actuator(s) of the robot after the predicted sequence of terminals is generated. Additionally or alternatively, the system can begin controlling the actuator(s) of the robot based on a partial predicted sequence of terminals prior to the generation of the entire predicted sequence of terminals.

Figure 6:
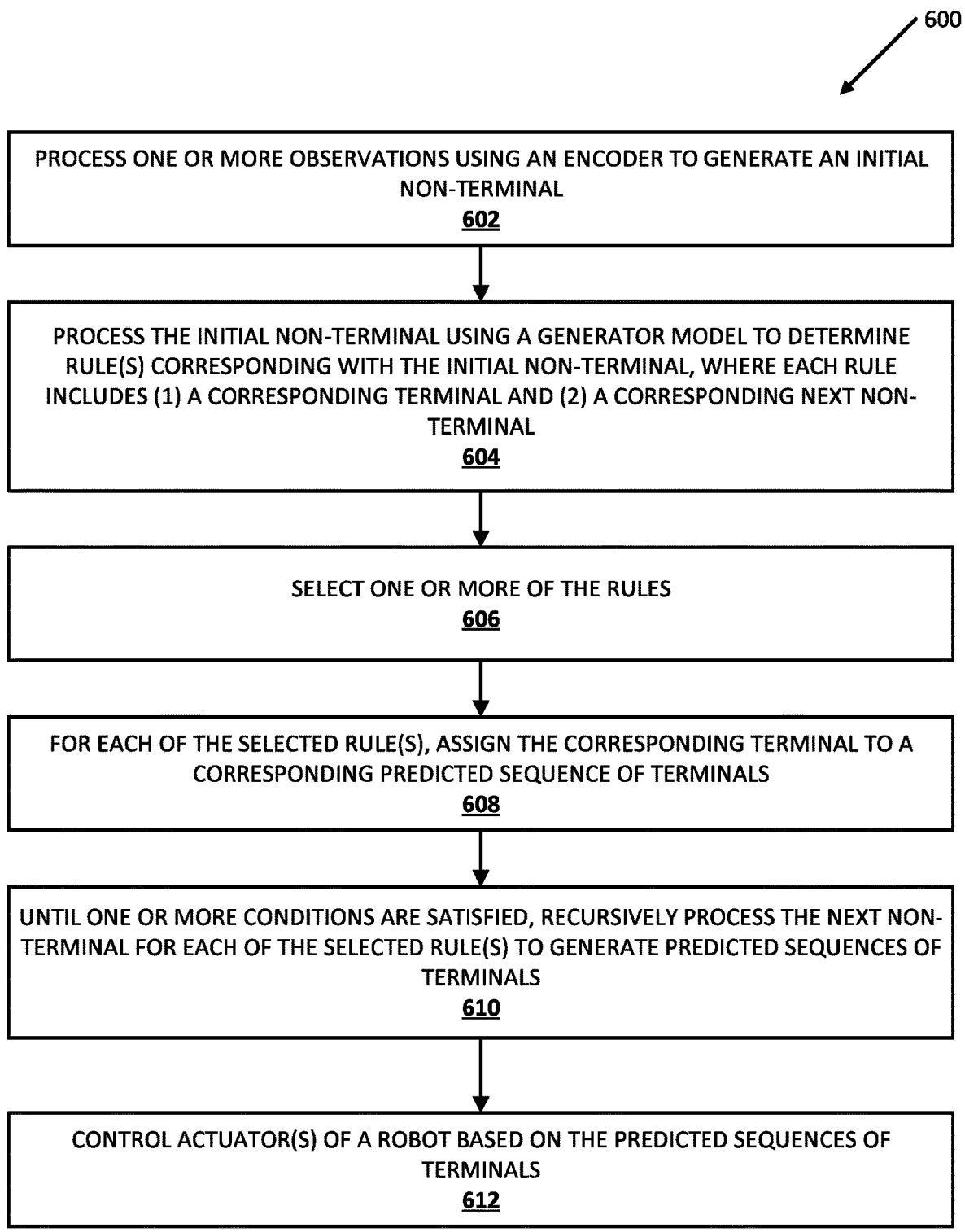
FIG. 6 is a flowchart illustrating another example process in accordance with implementations disclosed herein.

FIG. 6 is a flowchart illustrating a process 600 of determining multiple sequences of predicted terminals using a generator model portion of a prediction model according to implementations disclosed herein. For convenience, the operations of the flowchart are described with reference to a system that performs the operations. This system may include various components of various computer systems. Moreover, while operations of process 600 are shown in a particular order, this is not meant to be limiting. One or more operations may be reordered, omitted, and/or added.

At block 602, the system processes one or more observations using an encoder portion of a prediction model to generate an initial non-terminal.

At block 604, the system processes the initial non-terminal using a generator model portion of the prediction model to determine one or more rules corresponding with the initial non-terminal. In many implementations, each rule includes a corresponding terminal and a corresponding next non-terminal.

At block 606, the system selects one or more of the one or more rules determined at block 604. In many implementations, the system utilizes a Gumbel-Softmax process in selecting the one or more rules.

At block 608, for each of the selected rule(s), the system assigns the corresponding terminal to a corresponding predicted sequence of terminals.

At bock 610, until one or more conditions are satisfied, the system recursively processes the next non-terminal for each of the selected rule(s) to generate predicted sequences of terminals. For example, the system constrain the number of rules selected at each iteration, the system can constrain the length of one or more predicted sequences of terminals, the system can constrain the number of predicted sequences of terminals generated, and/or the system can constrain the predicted sequences of terminals based on additional condition(s).

At block 612, the system controls one or more actuators of a robot based on the predicted sequences of terminals. In many implementations, the system can control the actuator(s) of the robot to avoid the predicted location of a human, an object, an additional robot, etc. in the environment with the robot. In some implementations, the system can begin controlling the actuator(s) of the robot after the predicted sequence of terminals is generated. Additionally or alternatively, the system can begin controlling the actuator(s) of the robot based on a partial predicted sequence of terminals prior to the generation of the entire predicted sequence of terminals.

Figure 7:
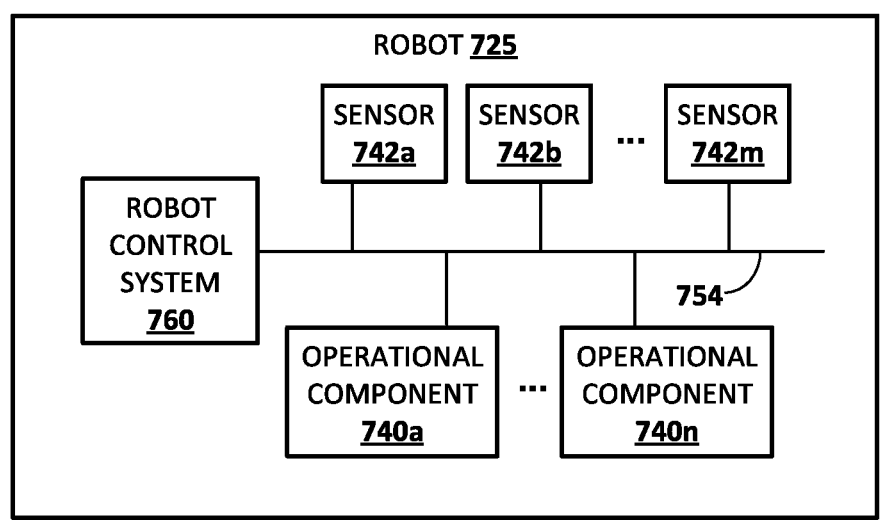
FIG. 7 schematically depicts an example architecture of a robot.

FIG. 7 schematically depicts an example architecture of a robot 725. The robot 725 includes a robot control system 760, one or more operational components 725a-725n, and one or more sensors 742a-742m. The sensors 742a-742m may include, for example, vision sensors, light sensors, pressure sensors, pressure wave sensors (e.g., microphones), proximity sensors, accelerometers, gyroscopes, thermometers, barometers, and so forth. While sensors 742a-m are depicted as being integral with robot 725, this is not meant to be limiting. In some implementations, sensors 742a-m may be located external to robot 725, e.g., as standalone units.

Operational components 740a-740n may include, for example, one or more end effectors and/or one or more servo motors or other actuators to effectuate movement of one or more components of the robot. For example, the robot 725 may have multiple degrees of freedom and each of the actuators may control actuation of the robot 725 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 760 may be implemented in one or more processors, such as a CPU, GPU, and/or other controller(s) of the robot 725. In some implementations, the robot 725 may comprise a "brain box" that may include all or aspects of the control system 760. For example, the brain box may provide real time bursts of data to the operational components 740a-n, with each of the real time bursts comprising a set of one or more control commands that dictate, inter alia, the parameters of motion (if any) for each of one or more of the operational components 740a-n. In some implementations, the robot control system 760 may perform one or more aspects of processes 500, and/or 600 described herein. As described herein, in some implementations all or aspects of the control commands generated by control system 760 can position limb(s) of robot 725 for robotic locomotion tasks. Although control system 760 is illustrated in FIG. 7 as an integral part of robot 725, in some implementations, all or aspects of the control system 760 may be implemented in a component that is separate from, but in communication with robot 725. For example, all or aspects of control system 760 may be implemented on one or more computing devices that are in wired and/or wireless communication with the robot 725, such as computing device 810.

Figure 8:
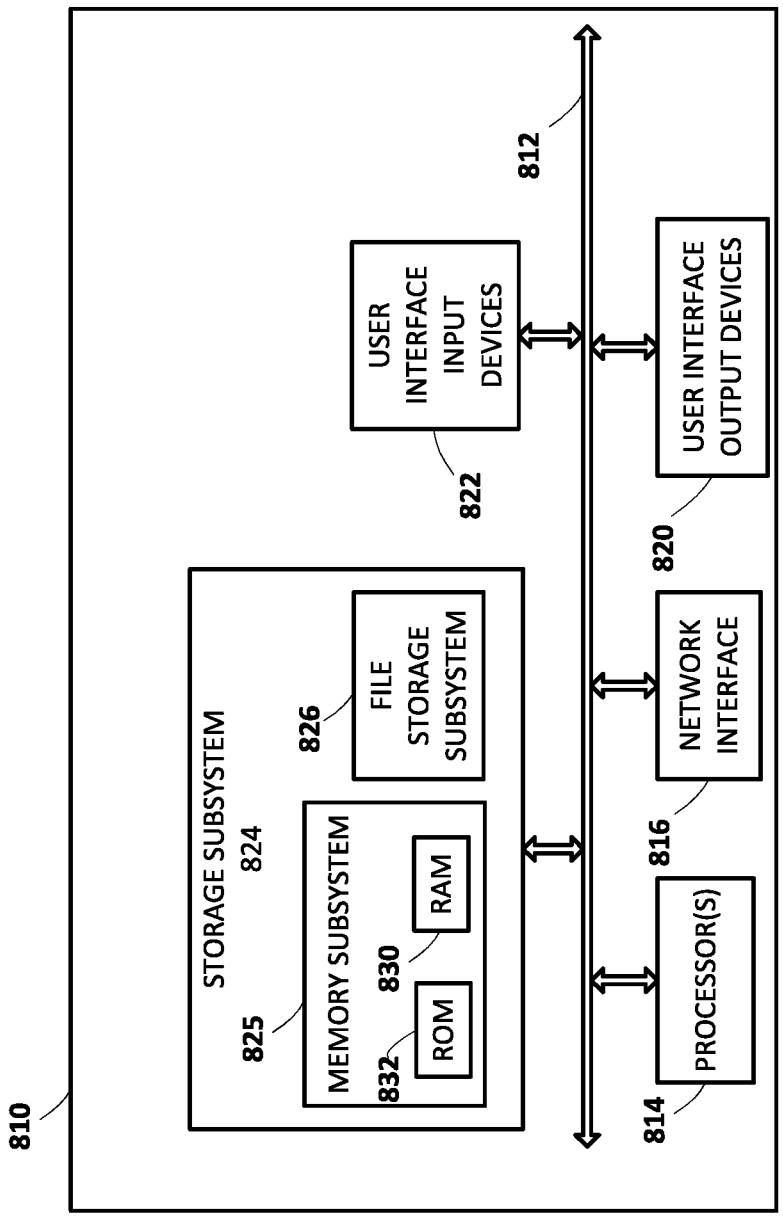
FIG. 8 schematically depicts an example architecture of a computing device.

FIG. 8 is a block diagram of an example computing device 810 that may optionally be utilized to perform one or more aspects of techniques described herein. In some implementations, one or more of a client computing device, and/or other component(s) may comprise one or more components of the example computing device 810.

Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of one or more of the processes of FIG. 5 and/or FIG. 6, as well as to implement various components depicted in FIG. 4 and/or FIG. 7.

These software modules are generally executed by processor 814 alone or in combination with other processors. Memory 825 used in the storage subsystem 824 can include a number of memories including a main random access memory ("RAM") 830 for storage of instructions and data during program execution and a read only memory ("ROM") 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided that includes generating a predicted sequence of terminals for use in controlling one or more actuators of a robot, wherein each of the terminals in the predicted sequence is a corresponding multidimensional representation of predicted activity in an environment of the robot at a corresponding future time step. In some implementations, generating the predicted sequence of terminals includes: receiving one or more observations, of the environment, captured using one or more sensors of the robot. In some implementations, the method includes determining an initial non-terminal by processing the one or more observations using an encoder portion of a prediction model, wherein the initial non-terminal is an encoded representation of observed activity in the environment captured in the one or more observations. Additionally or alternatively, the encoder can be distinct from the prediction model. In some implementations, for each of a plurality of iterations and until one or more conditions are satisfied, the method includes processing a corresponding non-terminal using a generator model portion of the prediction model to determine a corresponding set of rules for the corresponding non-terminal, wherein each rule, of the corresponding set of rules, includes a corresponding candidate terminal and a corresponding candidate next non-terminal, and wherein the initial non-terminal is used as the corresponding non-terminal that is processed in an initial iteration of the iterations. In some implementations, the method includes selecting a rule from the corresponding set of rules. In some implementations, the method includes assigning the corresponding candidate terminal, for the selected rule, as the next terminal in the predicted sequence of terminals, and assigning the corresponding candidate non-terminal, for the selected rule, as the corresponding non-terminal for use in generating the predicted sequence of terminals in an immediately subsequent iteration of the iterations. In some implementations, the method includes controlling the one or more actuators of the robot based on the predicted sequence of terminals.

These and other implementations of the technology disclosed herein can include one or more of the following features.

In some implementations, for the initial iteration, the method further includes selecting a plurality of additional rules from the corresponding set of rules. In some implementations, the method further includes using the plurality of additional rules to perform a plurality of additional iterations for generating additional predicted sequences of terminals. In some implementations, the method further includes controlling the one or more actuators of the robot based on the predicted additional sequences of terminals. In some versions of those implementations, selecting the plurality of additional rules from the corresponding set of rules includes processing the corresponding set of rules using a Gumbel-Softmax process to determine the plurality of additional rules. In some versions of those implementations, using the plurality of additional rules to perform the plurality of additional iterations for generating the additional predicted sequences of terminals includes, for each selected additional rule in the plurality of additional rules, assigning the corresponding candidate terminal, for the selected additional rule, as the next terminal in the one of the additional predicted sequences of terminals. In some versions of those implementations, the method further includes assigning the corresponding candidate non-terminal, for the selected additional selected rule, as the corresponding non-terminal for use in generating the additional predicted sequence of terminals in an additional subsequent iteration of the plurality of additional iterations.

In some implementations, processing the corresponding non-terminal using the generator model portion of the prediction model to determine the corresponding set of rules for the corresponding non-terminal includes selecting a plurality of memory units of the generator model portion of the prediction model corresponding to the set of rules for the corresponding non-terminal, wherein the plurality of memory units are a sub-set of global memory units corresponding to the generator model portion of the prediction model.

In some implementations, the prediction model further includes a discriminator model portion of the prediction model, wherein the discriminator model portion is jointly trained with the generator model portion of the prediction model. In some versions of those implementations, the method further includes jointly training the discriminator model portion of the prediction model with the generator model portion of the prediction model using stochastic adversarial based sampling, wherein jointly training the discriminator model portion of the prediction model with the generator model portion of the prediction model using stochastic adversarial based sampling includes generating a predicted sequence of training terminals using the generator model portion of the prediction model. In some implementations, the method further includes processing the generated predicted sequence of training terminals and a ground truth sequence of terminals using the discriminator model portion of the prediction model to generate predicted output indicating, for each sequence, whether the sequence is generated using the generator model portion of the prediction model or whether the sequence is the ground truth sequence. In some implementations, the method further includes updating one or more weights of the prediction model based on the generated predicted output.

In some implementations, the one or more observations, of the environment, captured using one or more of the sensors of the robot, comprises a continuous video sequence.

In some implementations, the predicted activity in the environment of the robot comprises a predicted pose of a human in the environment, and wherein each terminal in the predicted sequence is a multidimensional representation of the pose of a plurality of joints of the human. In some versions of those implementations, controlling the one or more actuators of the robot based on the predicted sequence of terminals comprises controlling the one or more actuators of the robot to avoid the predicted sequence of poses of the plurality of joints of the human.

In some implementations, the predicted activity in the environment with the robot is one or more predicted activities of a human in the environment with the robot, and wherein each terminal in the predicted sequence is a multidimensional representation of the one or more predicted activities of the human.

In some implementations, controlling the one or more actuators of the robot based on the predicted sequence of terminals includes controlling the one or more actuators of the robot based on an initial portion of the predicted sequence of terminals prior to the completion of generating the predicted sequence of terminals.

In some implementations, the one or more conditions includes the predicted sequence of terminals satisfying a threshold length.

In some implementations, the one or more conditions includes the additional predicted sequences of terminals satisfying a threshold number of sequences.

In some implementations, a method implemented by one or more processors is provided that includes training a generator model portion of a prediction model to generate a predicted sequence of terminals for use in controlling one or more actuators of a robot, wherein each of the terminals in the predicted sequence is a corresponding multidimensional representation of predicted activity in an environment of the robot at a corresponding future time step. In some implementations, training the generator model portion of the prediction model includes jointly training a discriminator model portion of the prediction model with the generator model portion of the prediction model using stochastic adversarial based sampling. In some implementations, jointly training the discriminator model portion of the prediction model with the generator model portion of the prediction model includes generating a predicted sequence of training terminals using the generator model portion of the prediction model. In some implementations, the method includes processing, using the discriminator model portion of the prediction model, the generated predicted sequence of training terminals and a ground truth sequence of terminals to generate output, wherein the generated output discriminates predicted sequences of training terminals from ground truth sequences of terminals. In some implementations, the method includes updating one or more weights of the prediction model based on the generated output.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the methods described herein. Some implementations also include one or more transitory or non-transitory computer readable storage media storing computer instructions executable by one or more processors to perform any of the methods described herein.

What is claimed is:

1. A method implemented by one or more processors, the method comprising:
    generating a predicted sequence of terminals for use in controlling one or more actuators of a robot, wherein each of the terminals represents corresponding predicted activity in an environment of the robot at a corresponding future time step, and wherein generating the predicted sequence of terminals comprises:
        receiving one or more observations, of the environment, captured using one or more sensors of the robot;
        determining an initial non-terminal by processing the one or more observations using a machine learning model, wherein the initial non-terminal is an encoded representation of observed activity in the environment captured in the one or more observations;
    for each of a plurality of iterations and until one or more conditions are satisfied:
        processing a corresponding non-terminal using the machine learning model to determine a corresponding set of rules for the corresponding non-terminal, wherein each rule, of the corresponding set of rules, includes a corresponding candidate terminal and a corresponding candidate next non-terminal, and wherein the initial non-terminal is used as the corresponding non-terminal that is processed in an initial iteration of the iterations;
        selecting a rule from the corresponding set of rules;
        assigning the corresponding candidate terminal, for the selected rule, as the next terminal in the predicted sequence of terminals, and
        assigning the corresponding candidate non-terminal, for the selected rule, as the corresponding non-terminal for use in generating the predicted sequence of terminals in an immediately subsequent iteration of the iterations; and
    controlling the one or more actuators of the robot based on the predicted sequence of terminals.

2. The method of claim 1, further comprising:
    for the initial iteration:
        selecting a plurality of additional rules from the corresponding set of rules;
        using the plurality of additional rules to perform a plurality of additional iterations for generating additional predicted sequences of terminals; and
        controlling the one or more actuators of the robot based on the predicted additional sequences of terminals.

3. The method of claim 2, wherein selecting the plurality of additional rules from the corresponding set of rules comprises:
    processing the corresponding set of rules using a Gumbel-Softmax process to determine the plurality of additional rules.

4. The method of claim 2, wherein using the plurality of additional rules to perform the plurality of additional iterations for generating the additional predicted sequences of terminals comprises:
    for each selected additional rule in the plurality of additional rules,
        assigning the corresponding candidate terminal, for the selected additional rule, as the next terminal in one of the additional predicted sequences of terminals; and
        assigning the corresponding candidate non-terminal, for the selected additional rule, as the corresponding non-terminal for use in generating the additional predicted sequence of terminals in an additional subsequent iteration of the plurality of additional iterations.

5. The method of claim 1, wherein the machine learning model includes a generator model portion of the machine learning model, and wherein processing the corresponding non-terminal using the macine learning model to determine the corresponding set of rules for the corresponding non-terminal comprises:
    selecting a plurality of memory units of the generator model portion of the machine learning model corresponding to the set of rules for the corresponding non-terminal, wherein the plurality of memory units are a sub-set of global memory units corresponding to the generator model portion of the machine learning model.

6. The method of claim 1, wherein the machine learning model further comprises a discriminator model portion of the machine learning model, wherein the discriminator model portion is jointly trained with the generator model portion of the machine learning model.

7. The method of claim 6, wherein jointly training the discriminator model portion of the machine learning model with the generator model portion of the machine learning model using stochastic adversarial based sampling, and wherein jointly training the discriminator model portion of the machine learning model with the generator model portion of the machine learning model using stochastic adversarial based sampling comprises:
    generating a predicted sequence of training terminals using the generator model portion of the machine learning model;
    processing, the generated predicted sequence of training terminals and a ground truth sequence of terminals using the discriminator model portion of the machine learning model to generate predicted output indicating, for each sequence, whether the sequence is generated using the generator model portion of the machine learning model or whether the sequence is the ground truth sequence; and updating one or more weights of the prediction model based on the generated predicted output.

8. The method of claim 1, wherein the one or more observations, of the environment, captured using one or more of the sensors of the robot, comprises a continuous video sequence.

9. The method of claim 1, wherein the predicted activity in the environment of the robot comprises a predicted pose of a human in the environment, and wherein each terminal in the predicted sequence is a multidimensional representation of the pose of a plurality of joints of the human.

10. The method of claim 9, wherein controlling the one or more actuators of the robot based on the predicted sequence of terminals comprises controlling the one or more actuators of the robot to avoid the predicted sequence of poses of the plurality of joints of the human.

11. The method of claim 1, wherein the predicted activity in the environment with the robot is one or more predicted activities of a human in the environment with the robot, and wherein each terminal in the predicted sequence is a multidimensional representation of the one or more predicted activities of the human.

12. The method of claim 1, wherein controlling the one or more actuators of the robot based on the predicted sequence of terminals comprises:
controlling the one or more actuators of the robot based on an initial portion of the predicted sequence of terminals prior to the completion of generating the predicted sequence of terminals.

13. The method of claim 1, wherein the one or more conditions includes the predicted sequence of terminals satisfying a threshold length.

14. The method of claim 2, wherein the one or more conditions includes the additional predicted sequences of terminals satisfying a threshold number of sequences.

15. A method implemented by one or more processors, the method comprising:
training a generator model portion of a prediction model to generate a predicted sequence of terminals for use in controlling one or more actuators of a robot,
wherein each of the terminals in the predicted sequence is a corresponding representation of predicted activity in an environment of the robot at a corresponding future time step, and
wherein training the generator model portion of the prediction model comprises:
jointly training a discriminator model portion of the prediction model with the generator model portion of the prediction model using stochastic adversarial based sampling, wherein jointly training the discriminator model portion of the prediction model with the generator model portion of the prediction model comprises:
generating a predicted sequence of training terminals using the generator model portion of the prediction model;
processing, using the discriminator model portion of the prediction model, the generated predicted sequence of training terminals and a ground truth sequence of terminals to generate output, wherein the generated output discriminates predicted sequences of training terminals from ground truth sequences of terminals; and
updating one or more weights of the prediction model based on the generated output.

16. A non-transitory computer readable storage medium storing computer program instructions that when executed by one or more processors of a computing system, cause the computing system to perform the method of:
generating a predicted sequence of terminals for use in controlling one or more actuators of a robot, wherein each of the terminals represent corresponding predicted activity in an environment of the robot at a corresponding future time step, and wherein generating the predicted sequence of terminals comprises:
receiving one or more observations, of the environment, captured using one or more sensors of the robot;
determining an initial non-terminal by processing the one or more observations using a machine learning model, wherein the initial non-terminal is an encoded representation of observed activity in the environment captured in the one or more observations;
for each of a plurality of iterations and until one or more conditions are satisfied:
processing a corresponding non-terminal using the machine learning model to determine a corresponding set of rules for the corresponding non-terminal, wherein each rule, of the corresponding set of rules, includes a corresponding candidate terminal and a corresponding candidate next non-terminal, and wherein the initial non-terminal is used as the corresponding non-terminal that is processed in an initial iteration of the iterations;
selecting a rule from the corresponding set of rules;
assigning the corresponding candidate terminal, for the selected rule, as the next terminal in the predicted sequence of terminals, and
assigning the corresponding candidate non-terminal, for the selected rule, as the corresponding non-terminal for use in generating the predicted sequence of terminals in an immediately subsequent iteration of the iterations; and
controlling the one or more actuators of the robot based on the predicted sequence of terminals.

17. A computing system configured to perform the method of:
generating a predicted sequence of terminals for use in controlling one or more actuators of a robot, wherein each of the terminals represents corresponding predicted activity in an environment of the robot at a corresponding future time step, and wherein generating the predicted sequence of terminals comprises:
receiving one or more observations, of the environment, captured using one or more sensors of the robot;
determining an initial non-terminal by processing the one or more observations using a machine-learning model, wherein the initial non-terminal is an encoded representation of observed activity in the environment captured in the one or more observations;
for each of a plurality of iterations and until one or more conditions are satisfied:
processing a corresponding non-terminal using the machine learning model to determine a corresponding set of rules for the corresponding non-terminal, wherein each rule, of the corresponding set of rules, includes a corresponding candidate terminal and a corresponding candidate next non-terminal, and wherein the initial non-terminal is used as the corresponding non-terminal that is processed in an initial iteration of the iterations;

selecting a rule from the corresponding set of rules;

assigning the corresponding candidate terminal, for the selected rule, as the next terminal in the predicted sequence of terminals, and assigning the corresponding candidate non-terminal, for the selected rule, as the corresponding non-terminal for use in generating the predicted sequence of terminals in an immediately subsequent iteration of the iterations; and controlling the one or more actuators of the robot based on the predicted sequence of terminals.

18. A non-transitory computer-readable storage medium storing instructions executable by one or more processors of a computing system to perform the method of:

generating a predicted sequence of terminals for use in controlling one or more actuators of a robot, wherein each of the terminals in the predicted sequence represents corresponding predicted activity in an environment of the robot at a corresponding future time step, and wherein generating the predicted sequence of terminals comprises:

receiving one or more observations, of the environment, captured using one or more sensors of the robot;

determining an initial non-terminal by processing the one or more observations using a machine-learning model, wherein the initial non-terminal is an encoded representation of observed activity in the environment captured in the one or more observations;

for each of a plurality of iterations and until one or more conditions are satisfied:

processing a corresponding non-terminal using the machine learning model to determine a corresponding set of rules for the corresponding non-terminal, wherein each rule, of the corresponding set of rules, includes a corresponding candidate terminal and a corresponding candidate next non-terminal, and wherein the initial non-terminal is used as the corresponding non-terminal that is processed in an initial iteration of the iterations;

selecting a rule from the corresponding set of rules;

assigning the corresponding candidate terminal, for the selected rule, as the next terminal in the predicted sequence of terminals, and assigning the corresponding candidate non-terminal, for the selected rule, as the corresponding non-terminal for use in generating the predicted sequence of terminals in an immediately subsequent iteration of the iterations; and controlling the one or more actuators of the robot based on the predicted sequence of terminals.

* * * * *